(12) United States Patent
Flaim et al.

(10) Patent No.: US 7,803,458 B2
(45) Date of Patent: Sep. 28, 2010

(54) HYBRID ORGANIC-INORGANIC POLYMER COATINGS WITH HIGH REFRACTIVE INDICES

(75) Inventors: Tony D. Flaim, St. James, MO (US); Yubao Wang, Rolla, MO (US); Ramil-Marcelo L. Mercado, Rolla, MO (US)

(73) Assignee: Brewer Science Inc., Rolla, MO (US)

( * ) Notice: Subject to any disclaimer, the term of this patent is extended or adjusted under 35 U.S.C. 154(b) by 914 days.

(21) Appl. No.: 11/246,399

(22) Filed: Oct. 7, 2005

(65) Prior Publication Data

US 2006/0030648 A1 Feb. 9, 2006

Related U.S. Application Data

(63) Continuation of application No. 10/758,503, filed on Jan. 15, 2004, now abandoned.

(60) Provisional application No. 60/441,693, filed on Jan. 21, 2003.

(51) Int. Cl.
*B32B 27/18* (2006.01)
(52) U.S. Cl. .................... 428/323; 524/176; 427/372.2; 427/379; 427/380
(58) Field of Classification Search .................. 428/323; 524/176; 427/372.2, 379, 380
See application file for complete search history.

(56) References Cited

U.S. PATENT DOCUMENTS

| | | | |
|---|---|---|---|
| 4,579,594 A * | 4/1986 | Nanao et al. ............ 106/287.24 |
| 4,687,707 A * | 8/1987 | Matsuo et al. .............. 428/336 |
| 4,710,557 A | 12/1987 | Warren |
| 5,109,080 A | 4/1992 | Wang et al. |
| 5,214,116 A | 5/1993 | Matsuoka et al. |
| 6,011,123 A * | 1/2000 | Kurosawa et al. ........... 525/431 |
| 6,300,464 B2 | 10/2001 | Morjirii et al. |
| 6,303,270 B1 | 10/2001 | Flaim et al. |
| 6,320,020 B1 | 11/2001 | Takuma et al. |
| 6,432,526 B1 | 8/2002 | Arney et al. |
| 6,451,420 B1 | 9/2002 | Jin et al. |
| 6,740,469 B2 | 5/2004 | Krishnamurthy et al. |
| 2002/0010273 A1 | 1/2002 | Matsumura et al. |
| 2002/0019461 A1 | 2/2002 | Yashiro et al. |
| 2004/0171743 A1 | 9/2004 | Flaim et al. |

FOREIGN PATENT DOCUMENTS

| EP | 0 125 638 | 11/1984 |
| JP | 09031385 | 2/1997 |
| WO | WO 2004/001806 | 12/2003 |

OTHER PUBLICATIONS

Wang et al., New High Refractive Index Organic/Inorganic Hybrid Materials from Sol-Gel Processing, 1991, Macromolecules, vol. 24, pp. 3449-3450.*
Chigrinov, Liquid Crystal Devices: Physics and Applications, 1999, Arthech House, pp. 215-216.*
Wang, B. et al., "New High Refractive Index Organic/Inorganic Hybrid Materials from Sol-Gel Processing," Macromolecules, vol. 24, No. 11, pp. 3449-3450, 1991.
Wen, J., and Wilkes, G. L., "Organic/Inorganic Hybrid Network Materials by the Sol-Gel Approach," Chem. Mater., vol. 8, No. 8, pp. 1667-1681, 1996.
Schiller, S. et al., "Influence of Deposition Parameters on the Optical and Structural Properties of $TiO_2$ Films Produced by Reactive D.C. Plasmatron Sputtering," Thin Solid Films, vol. 83, pp. 239-245, 1981.
Pulker, H. K., et al., "Refractive Indices of $TiO_2$ Films Produced by Reactive Evaporation of Various Titanium—Oxygen Phases," Applied Optics, vol. 15, No. 12, pp. 2986-2991, 1976.
Brinker et al., "Thin Films and Coatings," Sol-Gel Science, Academic Press, Chapter 14, pp. 841-847, 1990.
Wang, B., et al., "High Refractive Index Hybrid Ceramer Materials Prepared from Titanium Tetraisopropoxide and Poly(arylene ether phosphine oxide) Through Sol-Gel Processing," Polymer Communications, vol. 32, No. 13, pp. 400-402, 1991.
Wang et al., "New Ti-PTMO and Zr-PTMO Ceramer Hybrid Materials Prepared by the Sol Gel Method: Synthesis and Characterization," Journal of Polymer Science: Part A: Polymer Chemistry, vol. 29, pp. 905-909, 1991.

* cited by examiner

*Primary Examiner*—Callie E Shosho
*Assistant Examiner*—Elizabeth Robinson
(74) *Attorney, Agent, or Firm*—Hovey Williams LLP

(57) ABSTRACT

Novel compositions and methods of using those compositions to form metal oxide films or coatings are provided. The compositions comprise an organometallic oligomer and an organic polymer or oligomer dispersed or dissolved in a solvent system. The compositions have long shelf lives and can be prepared by easy and reliable preparation procedures. The compositions can be cured to cause conversion of the composition into films of metal oxide interdispersed with organic polymer or oligomer. The cured films have high refractive indices, high optical clarities, and good mechanical stabilities at film thicknesses of greater than about 1 μm.

18 Claims, No Drawings

HYBRID ORGANIC-INORGANIC POLYMER COATINGS WITH HIGH REFRACTIVE INDICES

RELATED APPLICATIONS

This application claims the priority benefit of a provisional application entitled HYBRID ORGANIC-INORGANIC POLYMER COATINGS WITH HIGH REFRACTIVE INDICES, Ser. No. 60/441,693, filed Jan. 21, 2003, incorporated by reference herein. This application is a continuation of U.S. patent application Ser. No. 10/758,503, filed Jan. 15, 2004, now abandoned, incorporated by reference herein.

BACKGROUND OF THE INVENTION

1. Field of the Invention

The present invention relates to novel compositions which can be formed into metal oxide films having high refractive indices. The compositions are useful for forming solid-state devices such as flat panel displays, optical sensors, integrated optical circuits, and light-emitting diodes.

2. Description of the Prior Art

The performance of many solid-state devices including flat panel displays, optical sensors, integrated optical (photonic) circuits, and light-emitting diodes (LEDs) can be improved by applying a transparent, high refractive index coating onto the light-emitting or light-sensing portion of the device structure. Organic polymer coatings offer easy, low-temperature application and robust mechanical properties, including good surface adhesion, when used on such devices. However, few organic polymers have refractive indices greater than 1.65 at visible wavelengths, and fewer still have indices of 1.70 or greater. Those polymers that do have higher indices generally contain a high concentration of large polarizable atoms such as bromine, iodine, or sulfur, which limits their thermal and chemical stability.

On the other hand, certain metal oxides, most notably those of titanium and zirconium, possess excellent optical clarity when applied as thin films and exhibit refractive indices of 2.0 or more at visible wavelengths. They, unfortunately, must be deposited by expensive and inefficient methods such as evaporation or sputtering, and then can only be applied as thin films (less than 1 μm in thickness) whereas device makers are often seeking films of several microns to several tens of microns in thickness. Moreover, the deposited metal oxide coatings are brittle and may not adhere well to device surfaces without high-temperature annealing, which may degrade device operation.

The well known sol-gel coating method has been used to deposit high index metal oxide coatings from solution. However, the coatings tend to be brittle and subject to cracking and require long, complicated curing schedules. Sol-gel coating solutions also have limited pot life, making the method difficult to practice on a commercial scale. More recently, the sol-gel method has been combined with conventional polymer chemistry to prepare inorganic-organic hybrid coatings in which the metal oxide phase, formed by in situ hydrolysis and condensation of a metal alkoxide, is chemically bonded to an organic polymer phase to obtain materials with greater toughness and durability. However, they are still prone to the pot life problems associated with sol-gel compositions and lend themselves best to silicon dioxide incorporation, which does not promote a high refractive index.

Inorganic-organic hybrid coatings have also been prepared by dispersing nanosized (1 to 50 nm in diameter) metal oxide particles in a polymer vehicle to produce transparent film compositions. However, the refractive indices of these compositions are largely restricted to the range of 1.55 to 1.70 unless very high metal oxide loadings (80%) are utilized. Moreover, preparation of the coatings requires many steps, including particle synthesis and purification, surface treatment, and dispersion, often under a non-ambient environment.

Therefore, in light of the shortcomings of the prior art, a need exists for coatings that have a refractive index greater than about 1.7, and preferably greater than about 1.75, at visible and near infrared wavelengths (from about 400-1700 nm), and that provide high optical clarity along with easy and reliable preparation, long shelf life, and good mechanical stability at film thicknesses of greater than 1 micron.

SUMMARY OF THE INVENTION

The present invention fills this need by broadly providing novel coating compositions for use in optical device applications.

In more detail, the compositions comprise an organometallic oligomer and an organic polymer or oligomer dispersed or dissolved in a solvent system. The organometallic oligomer can be linear or branched and will thermally decompose to a high refractive index metal oxide. Preferred organometallic oligomers comprise monomers having the structure

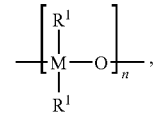

where:
n is greater than 2 and more preferably 3-10;
each M is individually selected from the group consisting of Groups 3-5 and 13-15 metals from the Periodic table of elements (more preferably Group 4 and even more preferably titanium or zirconium) other than silicon and having a combining valence of greater than +2; and
each $R^1$ is an organic moiety covalently bonded or coordinate-covalently bonded to M.

Preferred $R^1$ groups include those which form a —$CH_2$—O-M bond (where M is the metal atom as discussed above) such as those selected from the group consisting of alkoxys (preferably $C_1$-$C_{12}$, and more preferably $C_1$-$C_8$), alkyloxy-alkoxys (preferably $C_1$-$C_{12}$, and more preferably $C_1$-$C_8$), beta-diketones, beta-diketonates, and alkanolamines.

In another embodiment, preferred $R^1$ groups have a formula selected from the group consisting of

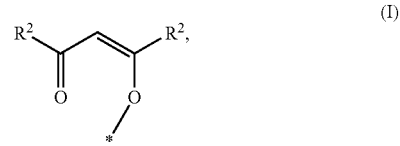

where:
* represents the covalent bond or coordinate-covalent bond with M; and
each $R^2$ is individually selected from the group consisting of alkyls (preferably $C_1$-$C_{12}$, and more preferably $C_1$-$C_8$, with methyl and ethyl being the most preferred), haloalkyls (preferably $C_1$-$C_{12}$, and more preferably $C_1$-$C_8$; preferably fluoroalkyls with trifluoromethyl being the most preferred), and —$OR^3$, where $R^3$ is selected from the group consisting of hydrogen, alkyls (preferably $C_1$-$C_{12}$, and more preferably $C_1$-$C_8$), aryls (preferably $C_6$-$C_{18}$, and more preferably $C_6$-$C_{12}$), and alkylaryls (preferably $C_1$-$C_{12}$, and more preferably $C_1$-$C_8$ for the alkyl component and preferably $C_6$-$C_{18}$, and more preferably $C_6$-$C_{12}$ for the aryl component); and

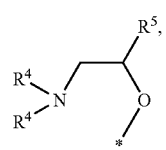

(II)

where:
*represents the covalent bond or coordinate-covalent bond with M;
each $R^4$ is individually selected from the group consisting of hydrogen, alkyls (preferably $C_1$-$C_{12}$, and more preferably $C_1$-$C_8$), hydroxyalkyls (preferably $C_1$-$C_{12}$, and more preferably $C_1$-$C_8$), aryls (preferably $C_6$-$C_{18}$, and more preferably $C_6$-$C_2$), and alkylaryls (preferably $C_1$-$C_{12}$, and more preferably $C_1$-$C_8$ for the alkyl component and preferably $C_6$-$C_8$, and more preferably $C_6$-$C_{12}$ for the aryl component), with at least one $R^4$ being selected from the group consisting of hydrogen, alkyls, (preferably $C_1$-$C_{12}$, and more preferably $C_1$-$C_8$) and hydroxyalkyls (preferably $C_1$-$C_{12}$, and more preferably $C_1$-$C_8$); and
$R^5$ is selected from the group consisting of hydrogen and methyl.

When $R^1$ is structure (II), particularly preferred $R^4$ groups include 2-hydroxyethyl and 2-hydroxypropyl. In these instances, the $R^4$ groups may optionally form coordinate-covalent bonds with the same or different metal atoms.

The organometallic oligomer is preferably present in the composition at a level of at least about 15% by weight, preferably from about 15-35% by weight, and more preferably from about 24-35% by weight, based upon the total weight of the composition taken as 100% by weight.

The organic polymer or oligomer can be either branched or linear. An organic oligomer rather than an organic polymer would typically be used, but the scope of this invention is intended to include both so long as the organic polymer or oligomer comprises a functional group (and preferably three such functional groups) capable of forming covalent or coordinate-covalent bonds with the organometallic oligomer.

The functional group can be present within the backbone of the organic polymer or oligomer, or it can be present as a group pendantly attached (either directly or through a linking group) to the polymer backbone, provided the functional group meets the other requirements discussed herein.

Preferred functional groups on the organic polymer or oligomer include those selected from the group consisting of —OH, —SH, and chelating moieties. Preferred chelating moieties include those selected from the group consisting of

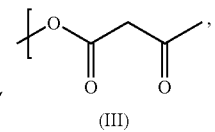

(III)

location of bond to polymer - either directly or via linking group

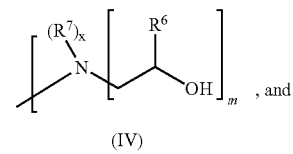

(IV)

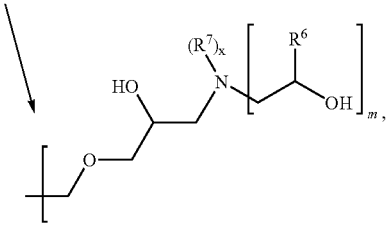

(V)

where:
m is 1 or 2;
when m is 2, then x is 0;
each $R^6$ is individually selected from the group consisting of hydrogen and methyl groups; and
each $R^7$ is individually selected from the group consisting of hydrogen and alkyls (preferably $C_1$-$C_{12}$, more preferably $C_1$-$C_8$, and even more preferably methyl).

Particularly preferred organic polymers or oligomers include those selected from the group consisting of poly(styrene-co-allyl alcohol), poly(ethylene glycol), glycerol ethoxylate, pentaerythritol ethoxylate, pentaerythritol propoxylate, and combinations thereof. The organic polymer or oligomer is preferably present in the composition at a level of at least about 3% by weight, preferably from about 3-35% by weight, and more preferably from about 3-20% by weight, based upon the total weight of the composition taken as 100% by weight. Finally, the organic polymer or oligomer preferably has a weight-average molecular weight of at least about 150 g/mol, preferably at least about 500 g/mol, and more preferably from about 1500-2500 g/mol.

Suitable solvent systems include most organic solvents such as those selected from the group consisting of alcohols, glycol ethers, esters, aromatic solvents, ketones, ethers, and mixtures thereof. Particularly preferred solvents are ethyl lactate, ethylene glycol ethers, and propylene glycol ethers (e.g., 1-propoxy-2-propanol). The solvent system is preferably present in the composition at a level of at least about 10% by weight, preferably from about 10-35% by weight, and more preferably from about 10-28% by weight, based upon the total weight of the composition taken as 100% by weight.

The compositions can include other solvent-soluble ingredients to modify the optical or physical properties of the coatings formed from the compositions. For example, the compositions can include other organic polymers and resins, low molecular weight (less than about 500 g/mol) organic compounds such as dyes, surfactants, and chelating agents (e.g., alkanolamines), and non-polymeric metal chelates such as metal alkoxides or metal acetylacetonates.

The compositions are prepared by dissolving/dispersing the organometallic oligomer and organic polymer or oligomer in the solvent system. This can be done simultaneously, or it can be carried out in two separate vessels followed by combining of the two dispersions or solutions. Any optional ingredients are added in a similar manner. The total solids content in the composition can vary from about 1-50% by weight, and more preferably from about 10-40% by weight, based upon the total weight of the composition taken as 100% by weight.

The compositions are applied to a substrate by any known method to form a coating layer or film thereon. Suitable coating techniques include dip coating, draw-down coating, or spray coating. A preferred method involves spin coating the composition onto the substrate at a rate of from about 500-4000 rpm (preferably from about 1000-3000 rpm) for a time period of from about 30-90 seconds to obtain uniform films. Substrates to which the coatings can be applied include flat panel displays, optical sensors, integrated optical circuits, and light-emitting diodes.

The applied coatings are preferably first baked at low temperatures (e.g., less than about 130° C., preferably from about 60-130° C., and more preferably from about 100-130° C.) for a time period of from about 1-10 minutes to remove the casting solvents. To effect curing or conversion of the organometallic oligomer to a metal oxide/organic polymer hybrid film, the coating is then baked at temperatures of at least about 150° C., and more preferably from about 150-300° C. for a time period of at least about 3 minutes (preferably at least about 5 minutes). Baking at the curing temperature for longer than 5 minutes will produce further small reductions in film thickness and small increases in refractive index.

In another embodiment, the film is heated to a temperature of at least about 300° C. for a time period of from about 5-10 minutes in order to thermally decompose essentially all (i.e., at least about 95% by weight, and preferably at least about 99% by weight) of the organic polymer or oligomer so that extremely high metal oxide content (at least about 95% by weight metal oxide) films are formed. This high-temperature baking can be carried out after a hybrid conversion bake step as discussed above, or in lieu of such a bake step.

The baking processes are conducted preferably on a hot plate-style baking apparatus, though oven baking may be applied to obtain equivalent results. The initial drying bake may not be necessary if the final curing process is conducted in such a way that rapid evolution of the solvents and curing by-products is not allowed to disrupt the film quality. For example, a ramped bake beginning at low temperatures and then gradually increasing to the range of 150-300° C. can give acceptable results. The choice of final bake temperature depends mainly upon the curing rate that is desired. If curing times of less than 5 minutes are desired, then final baking should be conducted at temperatures greater than about 200° C., and more preferably greater than about 225° C.

Though not wishing to be bound by theory, it is believed that the conversion of the organometallic oligomer to metal oxide involves its hydrolysis by moisture that is contained in the coating and/or adsorbed from the atmosphere during the casting and curing processes. Therefore, the curing process is preferably carried out in air or in an atmosphere where moisture is present to facilitate complete conversion to metal oxide. The curing process can also be aided by exposure of the coating to ultraviolet radiation, preferably in a wavelength range of from about 200-400 nm. The exposure process can be applied separately or in conjunction with a thermal curing process.

Cured coatings prepared according to the instant invention will have superior properties, even at final thicknesses of greater than 1 μm. For example, the cured coatings or films will have a refractive index of at least about 1.65, more preferably at least about 1.70, and even more preferably from about 1.75-2.00, at wavelengths of about 633 nm and thicknesses of about 0.5 μm or about 1 μm. Furthermore, cured coatings or films having a thickness of about 0.5 μm or about 1 μm will have a percent transmittance of at least about 80%, preferably at least about 90%, and even more preferably least about 95% at wavelengths of from about 633 nm. Finally, the curing process will yield films having a metal oxide content of from about 25-80% by weight, more preferably from about 25-75% by weight, and even more preferably from about 35-75% by weight, based upon the total weight of the cured film or layer taken as 100% by weight. Each of the foregoing properties can be achieved while yielding cured films having extremely good mechanical stabilities (i.e., no cracking of the films is visible when observed under a microscope at a magnification of 200×).

DETAILED DESCRIPTION OF THE PREFERRED EMBODIMENTS

Examples

The following examples set forth preferred methods in accordance with the invention. It is to be understood, however, that these examples are provided by way of illustration and nothing therein should be taken as a limitation upon the overall scope of the invention.

Examples 1 through 6

Preparation and Application of Hybrid Coatings

1. Coating Preparation

A series of hybrid coatings were prepared by first reacting poly(dibutyltitanate) with ethyl acetoacetate to form a beta-diketonate-chelated organometallic oligomer and then combining this product in solution with different proportions of poly(styrene-co-allyl alcohol) as the organic oligomer.

In this preparation method, 108.00 g of poly(dibutyltitanate) were weighed into a 500-ml closed container, followed by 54.00 g propylene glycol n-propyl ether. The contents were stirred until a clear, homogeneous solution was obtained. Next, over a period of 2 hours, 140.44 g of ethyl acetoacetate were added through a dropping funnel into the solution while constant stirring was carried out. The contents were allowed to stir overnight after completing the addition to yield an organometallic oligomer solution.

In the next step, 22.15 g of poly(styrene-co-allyl alcohol) (SAA 101, Mw=2200 g/mol) were dissolved by stirring in 22.15 g of propylene glycol n-propyl ether to yield an organic oligomer solution. The organic oligomer solution was then added in different proportions to the organometallic oligomer solution to give hybrid coating solutions containing the amounts of materials shown in Table 1. The resulting mixtures, which were clear and free of any gelled materials, were stirred for 4 hours and then filtered through a 0.1-μm Teflon® filter. The theoretical weight ratio of titanium dioxide to organic oligomer for the cured film product prepared from each coating solution also appears in Table 1.

TABLE 1

| Component | Ex. 1 | Ex. 2 | Ex. 3 | Ex. 4 | Ex. 5 | Ex. 6 |
|---|---|---|---|---|---|---|
| Poly(dibutyltitanate) | 108.00 g | 108.00 g | 108.00 g | 108.00 g | 108.00 g | 108.00 g |
| Ethyl acetoacetate | 140.44 g | 140.44 g | 140.44 g | 140.44 g | 140.44 g | 140.44 g |
| Poly(styrene-co-allyl alcohol) | 10.29 g | 13.71 g | 17.63 g | 22.15 g | 41.09 g | 76.23 g |
| Propylene glycol propyl ether | 64.29 g | 67.71 g | 71.63 g | 76.15 g | 95.09 g | 130.21 g |
| $TiO_2$/SAA101 w/w ratio | 80/20 | 75/25 | 70/30 | 65/35 | 50/50 | 35/65 |

2. Application and Properties

The coating solutions were applied onto quartz and silicon substrates by spin-coating, soft-baked on a 130° C. hot plate for 120 seconds, and then cured by baking on a 225° C. hot plate for 10 minutes. This cycle was repeated for some of the compositions to increase film thickness. The thickness of each resulting film was measured with an ellipsometer (633-nm light source) or by profilometry, and coating transparency (reported as percent transmission at 633 nm) was measured using a UV-visible spectrophotometer with no corrections for scattering or reflective losses. The refractive index of each coating was determined with the aid of a variable-angle scanning ellipsometer (VASE). The results are summarized in Table 2.

TABLE 2

| Property | Ex. 1 | Ex. 2 | Ex. 3 | Ex. 4 | Ex. 5 | Ex. 6 |
|---|---|---|---|---|---|---|
| Refractive Index (400 nm) | 2.01 | 1.94 | 1.90 | 1.86 | 1.78 | 1.72 |
| Refractive Index (633 nm) | 1.88 | 1.83 | 1.80 | 1.77 | 1.71 | 1.66 |
| Film Thickness (microns) | 0.88 | 1.10 | 1.85 | 2.15 | 2.50 | 4.28 |
| % Transmittance at 633 nm | 85.8 | 86.6 | 95.7 | 94.0 | 96.1 | 94.5 |
| $TiO_2$/SAA101 w/w ratio | 80/20 | 75/25 | 70/30 | 65/35 | 50/50 | 35/65 |

Example 7

Effect of Lower Curing Temperature on Hybrid Coating Refractive Index

The composition corresponding to Example 5 was applied as described above but cured at lower temperatures to show that a comparable refractive index could be obtained using sub-200° C. curing conditions. The results obtained for 150° C. curing (1 hour) and 175° C. curing (1 hour) were comparable to those obtained at 225° C. (10 min.), as can be seen in Table 3.

TABLE 3

| Curing Conditions | Refractive Index (400 nm) | Refractive Index (633 nm) |
|---|---|---|
| 225° C./10 min. | 1.78 | 1.71 |
| 175° C./60 min. | 1.75 | 1.68 |
| 150° C./60 min. | 1.73 | 1.66 |

Example 8

Preparation of a Hybrid Coating Composition from Modified Styrene-Allyl Alcohol Copolymer Having Acetoacetic Ester Chelating Groups A hybrid coating composition resembling that in Example 4 was prepared but, in this instance, poly(styrene-co-allyl alcohol) [SAA101] was first reacted with t-butyl acetoacetate to esterify a portion of the alcohol groups on the polymer, thus creating acetoacetic ester pendant groups that could form chelating bonds with the organometallic oligomer.

1. Modification of SAA101 with t-Butyl Acetoacetate

In this procedure, 50 g SAA101 powder were charged into a 500-ml, three-neck flask containing 275 g toluene and equipped with a distillation head, thermometer, and dropping funnel. The solution was heated to 50° C. while stirring to increase the dissolution rate of the SAA101. Once it had dissolved, 14.38 g of t-butyl acetoacetate were added to the solution through a dropping funnel over a period of 10 minutes. The mixture was heated to 100° C. after completing the addition, whereupon the evolution of by-product t-butyl alcohol was observed. The temperature of the contents was held at 100° C. for 1 extra hour to ensure complete reaction, during which time t-butyl alcohol was removed continuously from the reaction mixture. The reaction mixture was allowed to cool to room temperature, and the toluene was removed by rotating vacuum distillation. The residual material was further dried in a vacuum oven, yielding 52 g of the modified SAA101 product.

2. Coating Formulation

In this preparation, 7.00 g poly(dibutyltitanate) were weighed into a 60-ml closed container, followed by the addition of 7.00 g propylene glycol n-propyl ether. The contents were stirred at room temperature until a clear, homogeneous solution was obtained. Then, 6.90 g ethyl acetoacetate were slowly added with constant stirring to the solution prepared in procedure 1. The contents were allowed to stir overnight after completing the addition. Modified SAA101 (1.44 g) was dissolved in an equivalent amount of propylene glycol n-propyl ether and then added to the solution prepared in procedure 2. The mixture was stirred for 4 hours and then filtered through a 0.1-μm Teflon® filter. The values in Table 4 were obtained when the coating composition was applied and cured as described in Example 1.

TABLE 4

| Property | Ex. 8 |
|---|---|
| Refractive Index (400 nm) | 1.88 |
| Refractive Index (633 nm) | 1.78 |
| Film Thickness (microns) | 0.43 |
| % Transmittance at 633 nm | 89.5 |
| TiO2/SAA101 w/w ratio | 65/35 |

Example 9

Preparation of a Hybrid Coating Composition from an Acrylic Copolymer Having Pendant Acetoacetic Ester Functional Groups An acrylic copolymer having pendant acetoacetic ester functional groups was combined with poly(dibutyltitanate) to form a hybrid coating solution.

1. Preparation of Methyl Methyacrylate/2-Acetoacetoxyethyl Methacrylate Copolymer In this procedure, 20 g (0.198 mol) methyl methacrylate, 22.30 g (0.0989 mol) 2-acetoacetoxyethyl methacrylate, and 170 g tetrahyrdrofuran (THF) were placed in a 250-ml, 3-necked flask with a nitrogen inlet, condenser, glass stopper, and stir bar. The mixture was stirred until well mixed. Next, 0.4 g 2,2'-azobis(2-methylpropionitrile) (AIBN) were added, and the resulting mixture was stirred until homogeneous. The resulting solution was heated to reflux for 24 hours under a flow of nitrogen. A colorless, viscous liquid was obtained after the reaction period. Thermogravimetric analysis (TGA) showed this to contain 40% copolymer solids.

2. Coating Formulation

About 1.0 g of the above copolymer solution was placed in a glass vial and diluted by the addition of 2 g of THF. A stir bar was placed in the vial. In a separate glass vial 1.0 g of poly(dibutyltitanate) was placed followed by dilution with 2 g of THF. The diluted solution of poly(dibutyltitanate) was added dropwise to the stirred copolymer solution. A slight yellow coloration formed in the solution, finally giving a light yellow solution after all the organotitanate solution had been added. A freestanding thick film was prepared by casting the coating mixture onto the bottom of a polypropylene beaker and air-drying for 15 minutes, followed by hot blow drying for another 5 minutes. The coating was then peeled from the plastic surface. The film had a light yellow color and was brittle to touch.

Example 10

Use of Ultraviolet Radiation to Cure a Hybrid Coating Composition

The purpose of this example was to demonstrate how exposure to ultraviolet radiation can effect the conversion of the organometallic oligomer used in the new compositions to the final metal oxide component. Four silicon wafers were coated with an ethyl lactate solution of poly(butyltitanate) to which had been added two equivalents of ethyl acetoacetate per equivalent of titanium to form a chelated organotitanium polymer product. The coated wafers were soft-baked on a hot plate and then hard-baked at 205° C. for 60 seconds to partially cure the organotitanium polymer. The respective average film thicknesses for the four wafers at that point was 1266 Å as determined by ellipsometry. Three of the wafers were then exposed to ultraviolet light from a 500-W mercury-xenon arc lamp for 30, 60, or 90 seconds, respectively, after which the respective film thicknesses were redetermined. The results are listed in Table 5.

TABLE 5

| Exposure Time (sec) | Film Thickness (Å) |
|---|---|
| 0 | 1266 |
| 30 | 1084 |
| 60 | 943 |
| 90 | 873 |

The continuous reduction in film thickness as exposure time increased indicated that curing was proceeding, and volatile by-products were being expelled from the coating in the absence of heating. The occurrence of curing was also confirmed by placing droplets of aqueous tetramethylammonium hydroxide (TMAH) solution on the specimens at 30-second intervals. The unexposed coating etched completely away in less than 30 seconds, whereas the exposed coatings showed no evidence of etching, even when in contact with the etchant for 1 to 2 minutes. The inability of the etchant to dissolve the exposed coatings was evidence of their higher degree of curing than the unexposed specimen.

Example 11

1. Coating Preparation

Coatings were prepared by first reacting poly(dibutyltitanate) with ethyl acetoacetate to form a beta-diketonate-chelated organometallic oligomer and then combining this product in solution with one of two different organic oligomers.

In this preparation method, the poly(dibutyltitanate) was weighed into a 500-ml closed container, followed by addition of the propylene glycol n-propyl ether. The contents were stirred until a clear, homogeneous solution was obtained. Next, over a period of 2 hours, the ethyl acetoacetate was added through a dropping funnel into the solution while constant stirring was carried out. The contents were allowed to stir overnight after completing the addition to yield the organometallic oligomer solution.

In the next step, the particular organic oligomer was added to the organometallic oligomer solution to give hybrid coating solutions containing the amounts of materials shown in Table 6. The resulting mixtures, which were clear and free of any gelled materials, were stirred for 4 hours and then filtered through a 0.1-μm Teflon® filter.

TABLE 6

| Component | Ex. 1 | Ex. 2 |
|---|---|---|
| Poly(dibutyltitanate) | 300.07 g | 300.08 g |
| Ethyl acetoacetate | 390.88 g | 390.88 g |
| Poly(ethylene glycol), Mw = 600 g/mol | 38.09 g | — |
| Glycerol propoxylate, Mn = 725 g/mol | — | 38.09 g |
| Propylene glycol propyl ether | 150.06 g | 150.03 g |
| TiO$_2$/organic polymer or oligomer ratio w/w ratio | 75/25 | 75/25 |

2. Application and Properties

The coating solutions were applied onto quartz and silicon substrates by spin-coating, soft-baked on a 130° C. hot plate for 120 seconds, baked at 225° C. for 10 minutes, and then baked at 300° C. for 10 minutes to thermally decompose the organic oligomer, thus yielding an extremely high metal oxide content film. The properties are summarized in Table 7.

TABLE 7

| Property | Ex. 1 | Ex. 2 |
|---|---|---|
| Refractive Index (400 nm) | 2.20 | 2.16 |
| Refractive Index (633 nm) | 2.01 | 1.98 |
| Film Thickness (microns) | 0.24 | 0.24 |
| % Transmittance at 633 nm | 90 | 90 |

We claim:

1. The combination of:
   a substrate having a surface; and
   a cured layer that is a metal oxide and organic hybrid film on said substrate surface, said layer being formed from a composition comprising:
   a solvent system;

an organometallic oligomer dissolved or dispersed in said solvent system, said organometallic oligomer comprising recurring monomers having the formula

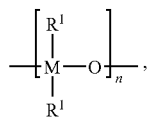

wherein:
n is 3-10;
each M is individually selected from the group consisting of Groups 3-5 and 13-15 metals other than silicon and having a combining valence of greater than ±2; and
each $R^1$ is an organic moiety covalently bonded or coordinate-covalently bonded to M; and
an organic polymer or oligomer having a weight-average molecular weight of at least about 150 g/mol, said organic polymer or oligomer comprising a functional group selected from the group consisting of chelating moieties selected from the group consisting of

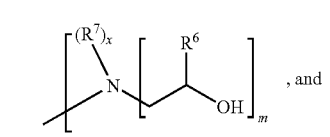

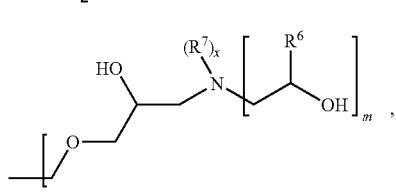

wherein:
m is 1 or 2;
when m is 2, then x is 0;
each $R^6$ is individually selected from the group consisting of hydrogen and methyl groups; and
each $R^7$ is individually selected from the group consisting of hydrogen and alkyls; and
wherein said cured layer has a refractive index of at least about 1.65 at a wavelength of about 633 nm and at a thickness of about 0.5 μm.

2. The combination of claim 1, wherein M is selected from the group consisting of Group 4 metals.

3. The combination of claim 1, wherein M is selected from the group consisting of titanium and zirconium.

4. The combination of claim 1, wherein each $R^1$ is individually selected from the group consisting of alkoxys, alkyloxyalkoxys, beta-diketones, beta-diketonates, and alkanolamines.

5. The combination of claim 4, wherein $R^1$ has a formula selected from the group consisting of

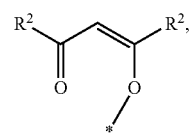

wherein:
* represents the covalent bond or coordinate-covalent bond with M; and
each $R^2$ is individually selected from the group consisting of alkyls, haloalkyls, and —OR, wherein $R^3$ is selected from the group consisting of hydrogen, alkyls, aryls, and alkylaryls; and

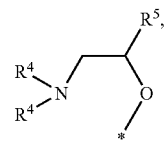

wherein:
* represents the covalent bond or coordinate-covalent bond with M;
each $R^4$ is individually selected from the group consisting of hydrogen, alkyls, hydroxyalkyls, aryls, and alkylaryls, with at least one $R^4$ being selected from the group consisting of hydrogen, alkyls, and hydroxyalkyls; and
$R^5$ is selected from the group consisting of hydrogen and methyl.

6. The combination of claim 1, wherein said layer has a percent transmittance of at least about 80% at a wavelength of about 633 nm and at a thickness of about 0.5 μm.

7. The combination of claim 1, wherein said substrate is one used in a device selected from the group consisting of flat panel displays, optical sensors, integrated optical circuits, and light-emitting diodes.

8. A method of forming a solid-state device structure, said method comprising the steps of:
applying a composition to a substrate surface to form a layer of said composition on said substrate surface, said composition comprising:
a solvent system;
an organometallic oligomer dissolved or dispersed in said solvent system, said organometallic oligomer comprising recurring monomers having the formula

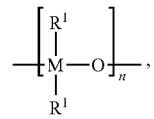

wherein:
n is 3-10;
each M is individually selected from the group consisting of Groups 3-5 and 13-15 metals other than silicon and having a combining valence of greater than +2; and each R¹ is an organic moiety covalently bonded or coordinate-covalently bonded to M; and an organic polymer or oligomer having a weight-average molecular weight of at least about 150 g/mol, said organic polymer or oligomer comprising a functional group is selected from the group consisting of chelating moieties selected from the group consisting of

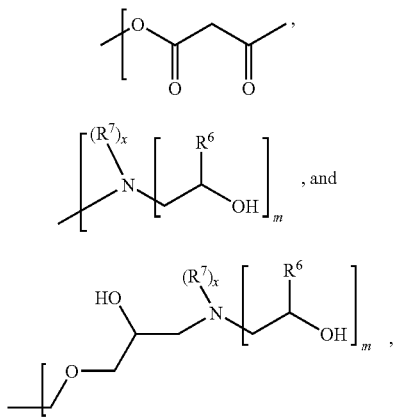

wherein:
m is 1 or 2;
when m is 2, then x is 0;
each $R^6$ is individually selected from the group consisting of hydrogen and methyl groups; and
each $R^7$ is individually selected from the group consisting of hydrogen and alkyls; and heating said layer at a temperature of from about 150-300° C. to yield a hybrid metal oxide-organic film having a refractive index of at least about 1.65 at a wavelength of about 633 nm and at a film thickness of about 0.5 μm.

9. The method of claim 8, wherein M is selected from the group consisting of Group 4 metals.

10. The method of claim 8, wherein M is selected from the group consisting of titanium and zirconium.

11. The method of claim 8, wherein each R¹ is individually selected from the group consisting of alkoxys, alkyloxyalkoxys, beta-diketones, beta-diketonates, and alkanolamines.

12. The method of claim 11, wherein R¹ has a formula selected from the group consisting of

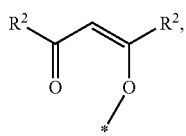

wherein:
represents the covalent bond or coordinate-covalent bond with M; and
each $R^2$ is individually selected from the group consisting of alkyls, haloalkyls, and —$OR^3$, wherein $R^3$ is selected from the group consisting of hydrogen, alkyls, aryls, and alkylaryls; and

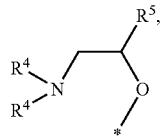

wherein:
represents the covalent bond or coordinate-covalent bond with M;
each $R^4$ is individually selected from the group consisting of hydrogen, alkyls, hydroxyalkyls, aryls, and arylalkyls, with at least one $R^4$ being selected from the group consisting of hydrogen, alkyls, and hydroxyalkyls; and
$R^5$ is selected from the group consisting of hydrogen and methyl.

13. The method of claim 8, wherein said substrate is one used in a device selected from the group consisting of flat panel displays, optical sensors, integrated optical circuits, and light-emitting diodes.

14. The method of claim 8, wherein after said heating step said film has a thickness of greater than about 1 μm and is free of cracks when observed under a microscope at a magnification of 200×.

15. The method of claim 8, further comprising the step of preheating said composition prior to said heating step, said preheating step comprising heating said composition to a temperature of less than about 130° C. for a time of from about 1-10 minutes.

16. The method of claim 8, wherein after said heating step said film has a percent transmittance of at least about 80% at a wavelengths of about 600 nm and at a film thickness of about 0.5 μm.

17. The combination of:
a substrate having a surface; and
a cured layer that is a metal oxide and organic hybrid film on said substrate surface, said layer being formed from a composition comprising:
a solvent system;
an organometallic oligomer dissolved or dispersed in said solvent system, said organometallic oligomer comprising recurring monomers having the formula

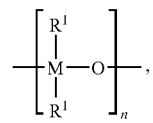

wherein:
n is 3-10;
each M is individually selected from the group consisting of Groups 3-5 and 13-15 metals other than silicon and having a combining valence of greater than +2; and
each R¹ is an organic moiety covalently bonded or coordinate-covalently bonded to M; and
an organic polymer or oligomer having a weight-average molecular weight of at least about 150 g/mol, said organic polymer or oligomer comprising a functional group selected from the group consisting of chelating moieties selected from the group consisting of

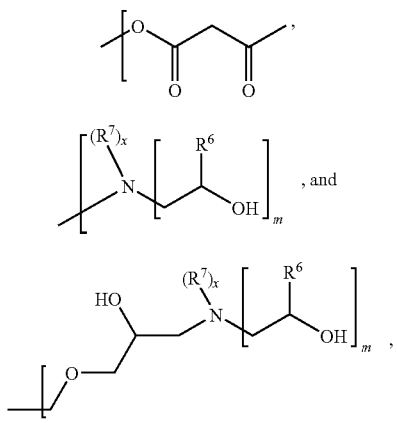

wherein:
- m is 1 or 2;
- when m is 2, then x is 0;
- each $R^6$ is individually selected from the group consisting of hydrogen and methyl groups; and
- each $R^7$ is individually selected from the group consisting of hydrogen and alkyls; and wherein said cured layer has a percent transmittance of at least about 80% at a wavelength of about 633 nm and at a thickness of about 0.5 μm.

18. A method of forming a solid-state device structure, said method comprising the steps of:

applying a composition to a substrate surface to form a layer of said composition on said substrate surface, said composition comprising:
- a solvent system;
- an organometallic oligomer dissolved or dispersed in said solvent system, said organometallic oligomer comprising recurring monomers having the formula

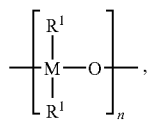

wherein:

n is 3-10 each M is individually selected from the group consisting of Groups 3-5 and 13-15 metals other than silicon and having a combining valence of greater than 4-2; and each $R^1$ is an organic moiety covalently bonded or coordinate-covalently bonded to M; and an organic polymer or oligomer having a weight-average molecular weight of at least about 150 g/mol, said organic polymer or oligomer comprising a functional group selected from the group consisting of chelating moieties selected from the group consisting of

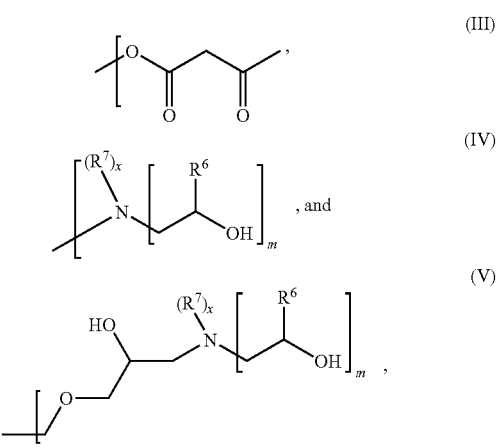

wherein:
- m is 1 or 2;
- when m is 2, then x is 0;
- each $R^6$ is individually selected from the group consisting of hydrogen and methyl groups; and
- each $R^1$ is individually selected from the group consisting of hydrogen and alkyls; and heating said layer at a temperature of from about 150-300° C. to yield a hybrid metal oxide-organic film having a percent transmittance of at least about 80% at a wavelength of about 600 nm and at a film thickness of about 0.5 μm.

* * * * *

UNITED STATES PATENT AND TRADEMARK OFFICE
CERTIFICATE OF CORRECTION

PATENT NO.         : 7,803,458 B2
APPLICATION NO.    : 11/246399
DATED              : September 28, 2010
INVENTOR(S)        : Tony D. Flaim, Yubao Wang and Ramil-Marcelo L. Mercado It is certified that error appears in the above-identified patent and that said Letters Patent is hereby corrected as shown below:

Column 11, line 17, "greater than ±," should read:
-- greater than +2 --

Column 12, line 14, "-OR," should read:
-- -OR$^3$, --

Column 13, line 61, "represents the covalent bond," should read:
-- * represents the covalent bond --

Column 14, line 11, "represents the covalent bond," should read:
-- * represents the covalent bond --

Signed and Sealed this
Tenth Day of July, 2012

David J. Kappos
*Director of the United States Patent and Trademark Office*